(12) United States Patent
Frake et al.

(10) Patent No.: US 6,526,466 B1
(45) Date of Patent: Feb. 25, 2003

(54) METHOD AND SYSTEM FOR PLD SWAPPING

(75) Inventors: Scott O. Frake, Cupertino, CA (US); James L. McManus, Campbell, CA (US); David P. Schultz, San Jose, CA (US); Wilson K. Yee, Pleasanton, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/438,220

(22) Filed: Nov. 12, 1999

(51) Int. Cl.[7] ............................................... G06F 13/00
(52) U.S. Cl. ...................................... 710/302; 327/530
(58) Field of Search ................................. 710/302, 305; 327/108, 109, 110, 111, 112, 309, 310, 311, 312, 313, 314, 315, 316, 317, 318, 319, 530–550

(56) References Cited

U.S. PATENT DOCUMENTS

| | | | | |
|---|---|---|---|---|
| 5,900,021 A | * | 5/1999 | Tiede et al. | 365/189.02 |
| 6,127,882 A | * | 10/2000 | Vargha et al. | 327/540 |
| 6,138,195 A | * | 10/2000 | Bermingham et al. | 365/26 |
| 6,339,343 B1 | * | 1/2002 | Kim et al. | 326/83 |
| 6,400,203 B1 | * | 6/2002 | Bezzi et al. | 327/309 |

OTHER PUBLICATIONS

"The Programmable Logic Data Book", available from Xilinx, Inc., 2100 Logic Drive, San Jose, CA 95124, 1999, pp. 4–11 to 4–49.
"The Programmable Logic Data Book", available from Xilinx, Inc., 2100 Logic Drive, San Jose, CA 95124, 1999, pp. 3–3 to 3–16.

* cited by examiner

Primary Examiner—Glenn A. Auve
(74) Attorney, Agent, or Firm—Jeanette S. Harms; John Kubodera; Edel M. Young

(57) ABSTRACT

An apparatus and method for enabling hot swapping of programmable logic devices (PLDs) and boards containing PLDs is provided. If the hot swap capability is desired, a hot swap terminal on the PLD is set to facilitate a floating state on the input/output pad of the PLD. Further, the input buffer and the output buffer of the PLD are disabled. In one embodiment, a predetermined voltage is provided on the output terminal of the input buffer. In this configuration, the hot swap circuit eliminates any leakage current, ensures no static current occurs, and provides appropriate signals to the internal circuits of the PLD.

8 Claims, 3 Drawing Sheets

US 6,526,466 B1

METHOD AND SYSTEM FOR PLD SWAPPING

FIELD OF THE INVENTION

The present invention relates generally to interconnecting integrated circuits while power connections are active (hot swapping), and particularly to hot swapping programmable logic devices.

BACKGROUND OF THE INVENTION

Hot swapping refers to the insertion or removal of electronic components, such as integrated circuits or circuit boards, into or from powered-up systems. CompactPCI, PCMCIA, Universal Serial Bus (USB), SCSI, and other standards provide strict mandates on leakage current and other power-up/power-down aspects of hot swapping. Hot swapping an ill-designed integrated circuit can adversely affect system operation.

There are a number of integrated circuits commercially available for providing hot swap compatibility. However, such integrated circuits must be included on a circuit board with a plurality of other devices. Therefore, an on-chip solution for hot swapping is still needed.

One type of electronic component in need of an on-chip hot swap solution is the programmable logic device (PLD), such as the field programmable gate array (FPGA). An FPGA includes configurable logic blocks (CLBs) to construct the user's logic, input/output blocks (IOBs) to provide the interface between the package pins and internal signal lines, and programmable interconnect to connect the input and output terminals of the above-referenced blocks to the appropriate networks. The functionality of the FPGA is customized during configuration by programming internal memory cells associated with the CLBs, IOBs, and programmable interconnect. Additional information regarding FPGAs can be found in "The Programmable Logic Data Book", pages 4–11 to 4–49, published by Xilinx, Inc. in 1999.

FIG. 1 illustrates a portion of an IOB 100 including an input buffer 102, a tristate output buffer 104, and a pull-up transistor 110. During power-up and configuration (hereinafter referred to only as configuration) of the FPGA, the signal on line 109 is a logic one. In this manner, NOR gate 111 provides a logic zero signal (i.e. the signal on line 112 is a "don't care") to the gate of pull-up transistor 110, thereby turning on p-type transistor 110 and pulling up I/O pad 101 to voltage Vcc. The logic one signal on line 109 is inverted by inverter 108 and provided to NAND gate 106. Thus, NAND gate 106 outputs a logic one signal (i.e. the signal on line 107 is a "don't care"), thereby ensuring output buffer 114 is in a high impedance mode (tristated).

Because a logic signal (in this case, a logic one signal) is provided on I/O pad 101, input buffer 102 does not draw static current during configuration of the FPGA. Note that the logic signal provided to input buffer 102 further ensures that internal circuits in the FPGA receive a constant signal which minimizes any on-chip disturb conditions during the configuration mode. This logic signal also minimizes any adverse effect to the external circuits or systems coupled to I/O pad 101 during the configuration mode of the FPGA.

After configuration is complete (the user mode), the signal on line 109 is a logic zero. In this state, pull-up transistor 110 is controlled by the signal on line 112. Typically, pull-up transistor 110 is turned on (a logic one signal on line 112) only if tristate output buffer 104 is in a high impedance mode. Otherwise, pull-up transistor 110 is turned off (a logic zero on line 112).

Because the signal on line 109 is a logic zero, tristate output buffer 104 is controlled by the signal on line 107. If the signal is a logic one, then tristate (active low enable) output buffer 104 functions as a normal buffer. In this configuration, IOB 100 is used as an output block or a dual function (input/output) block. If the signal is a logic zero, then output buffer 104 is tristated and IOB 100 is used as an input only block.

Referring to FIG. 2, a hot swappable board 200 connects I/O pad 101 to a one-volt supply Vp across a ten thousand Ohm (10 k Ohm) resistor 205. In accordance with hot swap specifications, this one-volt supply Vp must precharge I/O pad 101 to an intermediate voltage level before contact with a backplane 210. This precharging reduces noise on backplane 210. However, any voltage difference between voltage Vp and the voltage on I/O pad 101 (Vcc) during a hot swap induces a leakage current IL through pull-up transistor 110. Current hot swap specifications have extremely tight restrictions on leakage current. For example, assuming I/O pad 101 is pulled to voltage Vcc (or even to ground in other embodiments), the resultant leakage current $I_L$ could be from two to twenty-five times the acceptable limit of most hot swap specifications.

Therefore, a need arises for a way to enable hot swapping of PLDs and boards including PLDs, while still preventing the input buffers in the IOBs from drawing static current during device configuration and providing appropriate signals to the internal circuits of the PLDs.

SUMMARY OF THE INVENTION

The present invention provides a hot swap circuit that eliminates any leakage current, ensures no static current occurs, and provides appropriate signals to the internal circuits of the PLD. In accordance with the present invention, the hot swap circuit forms part of an input/output block of a PLD. The hot swap circuit includes an input buffer disable circuit and an output buffer disable circuit, both disable circuits coupled to a pad of the PLD.

The output buffer disable circuit includes an output buffer for providing signals to the pad and a first logic circuit having an output terminal coupled to an enable terminal of the output buffer. During power-up or configuration, the first logic circuit disables (tristates) the output buffer. In accordance with the present invention, the output buffer disable circuit further includes a second logic circuit having an output terminal coupled to a gate of a transistor. The transistor is coupled between a voltage source and the pad. In one embodiment, the transistor is a pull-up transistor coupled between voltage Vcc and the pad. During a hot swap, the second logic circuit turns off this pull-up transistor, thereby providing a critical floating voltage on the pad that eliminates any leakage current. Thus, the present invention advantageously conforms to all current hot swap specifications.

The input buffer disable circuit comprises an input buffer for receiving signals from the pad and a third logic circuit operatively coupled to the input buffer to selectively disable the input buffer and provide a predetermined voltage on the output terminal of the input buffer. The input buffer includes a first inverter and a second inverter connected in series. A pull-down transistor is coupled between the output terminal of the first inverter and ground. The gate of the pull-down transistor is coupled to the third logic circuit. During power-up and configuration, the third logic circuit disables the first inverter (and thus the input buffer) and turns on the pull-down transistor, thereby ensuring no static current is generated and providing a constant, known signal to the internal circuits of the PLD.

After configuration is complete (the user mode), the third logic circuit enables the input buffer. However, second and third logic circuits can selectively turn on the pull-up transistor and disable the output buffer, respectively.

Because each of the input buffer, the output buffer, and the pull-up transistor are selectively controlled, the present invention advantageously enables full backward compatibility with previous design solutions involving the PLD.

BRIEF DESCRIPTION OF THE DRAWINGS

For clarity, similar elements in the figures are labeled with similar reference numbers.

DETAILED DESCRIPTION OF THE DRAWINGS

Figure 1:
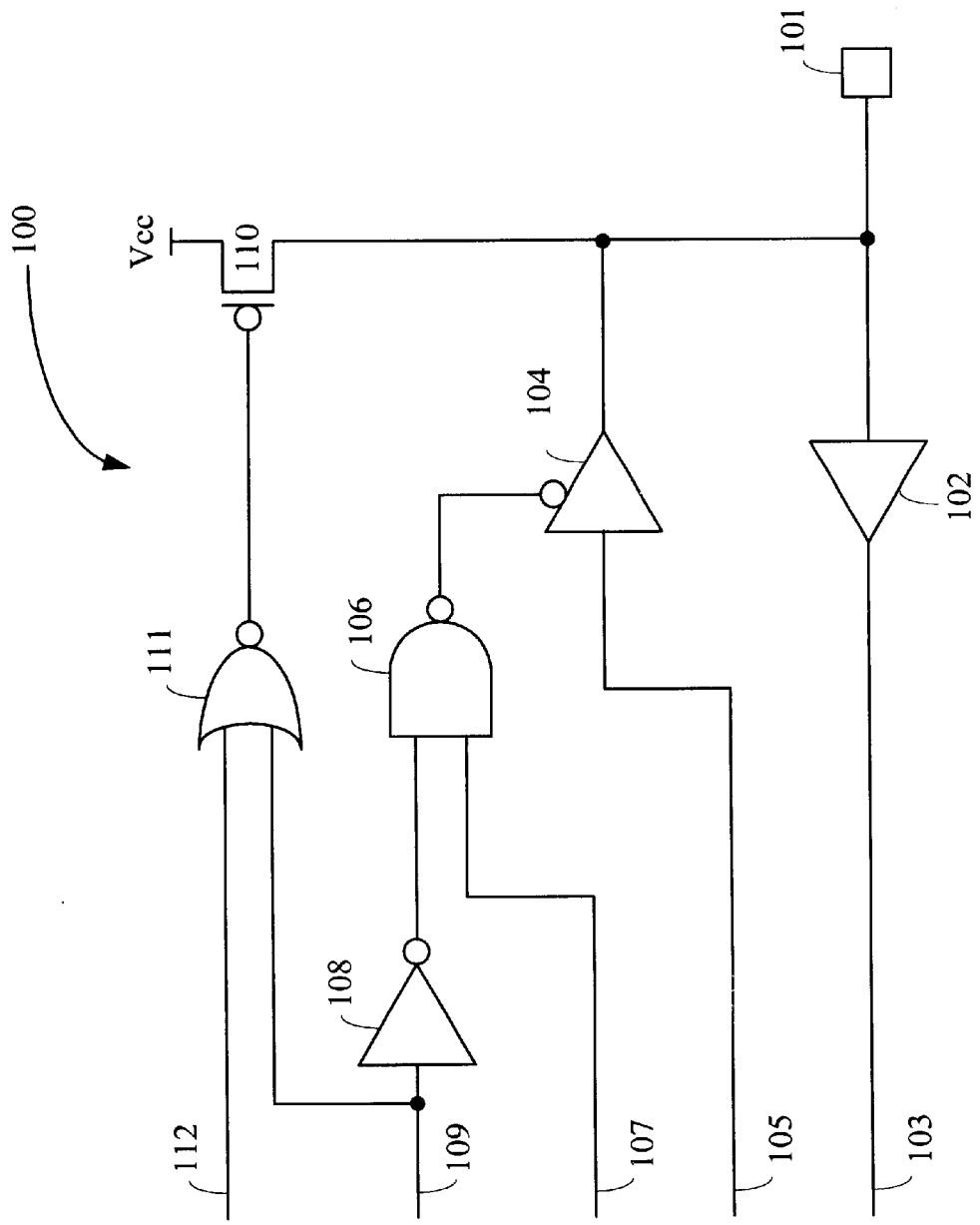
FIG. 1 is a simplified block diagram of a prior art input/output block on a programmable logic device.
Figure 2:
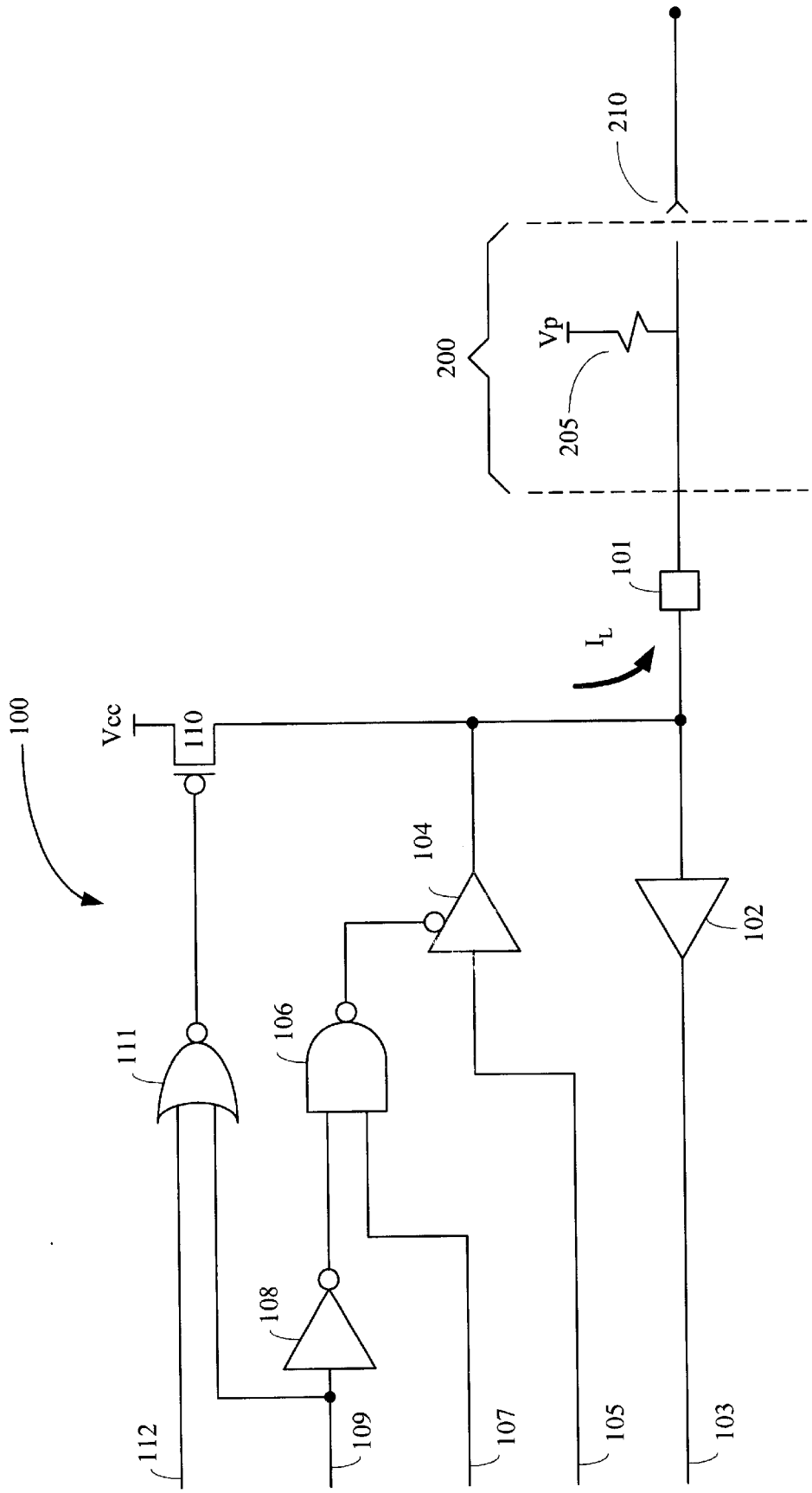
FIG. 2 illustrates the input/output block of FIG. 1 connected to a board, which in turn is connectable to an actively powered backplane.
Figure 3:
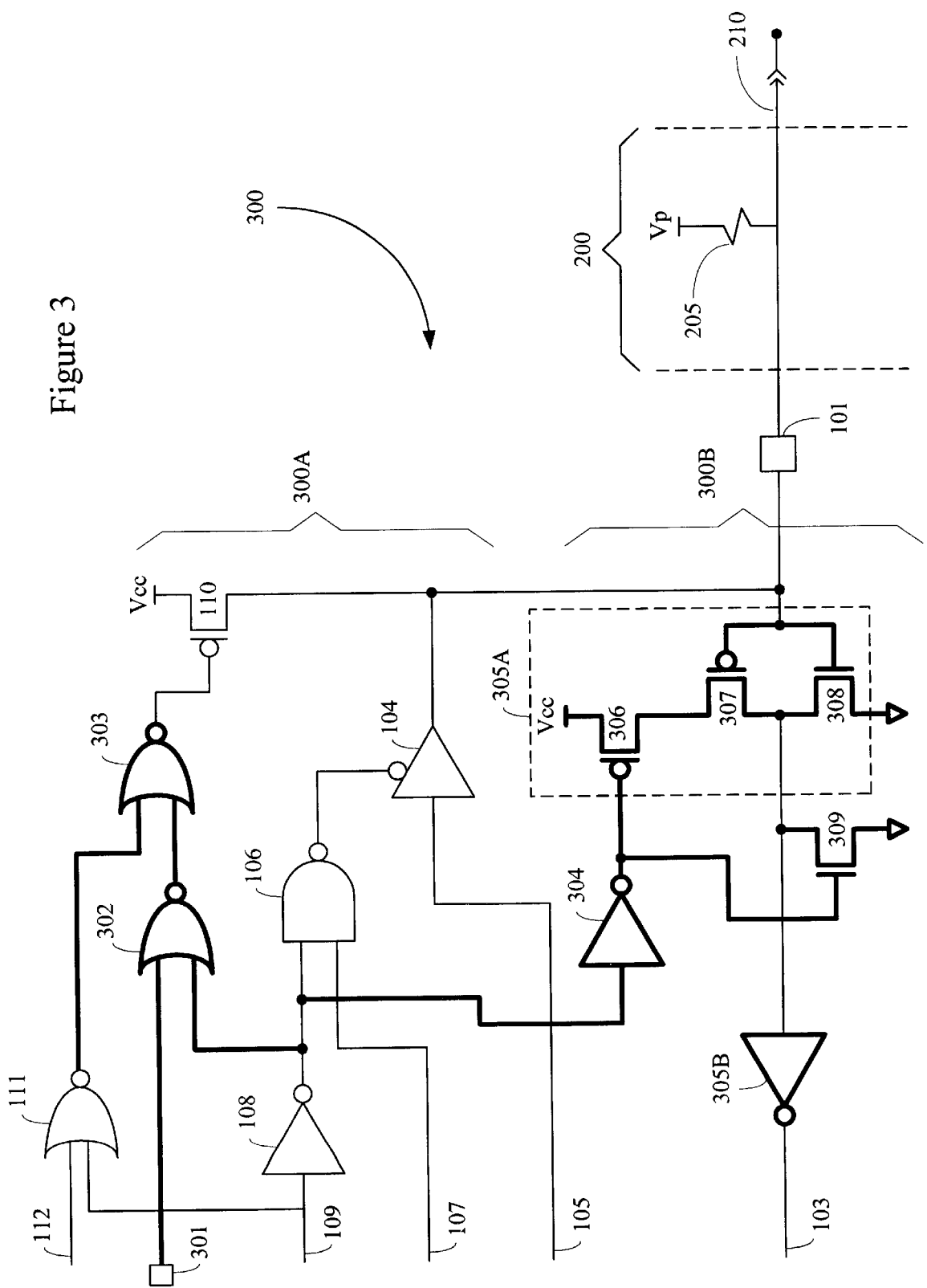
FIG. 3 is a simplified block diagram of a hot swap circuit of the present invention.

FIG. 3 illustrates a hot swap circuit 300 of the present invention incorporated into the input/output block (IOB) of a PLD. Hot swap circuit 300 includes an output buffer disable circuit 300A as well as an input buffer disable circuit 300B. Output buffer disable circuit 300A includes a hot swap pad 301, which is tied to a configuration mode pin (not shown). Note that some programmable logic devices (PLDs), such as the Virtex™ FPGAs available from Xilinx, Inc., already include a heretofore-unused configuration mode pin which can be easily adapted for use as described herein.

As mentioned previously, during configuration, the signal on line 109 remains a logic one. This logic one signal is inverted by inverter 108 and provided to a NAND gate 106, thereby driving a logic one signal on the output terminal of that gate and tristating output buffer 104. Thus, as with IOB 100, the signal on line 107 is a "don't care" during configuration.

A NOR gate 302 receives the logic zero signal output by inverter 108. In this manner, NOR gate 302 is controlled by the signal on hot swap pad 301 during configuration.

If a hot swap capability is desired, then a logic one signal is provided on hot swap pad 301. Thus, during configuration, NOR gate 302 receives the logic one on hot swap pad 301 as well as a logic zero from inverter 108 and outputs a logic zero to NOR gate 303. In addition to this input signal, NOR gate 303 receives the logic zero provided by NOR gate 111 (once again, the signal on line 112 being a "don't care"). In this manner, NOR gate 303 outputs a logic one signal, thereby turning off pull-up transistor 110 and providing a floating voltage on I/O pad 101. In this state, no leakage current can occur. Thus, output buffer disable circuit 300A of the present invention ensures that the PLD advantageously meets all hot swap specifications.

If a hot swap is not desired, a logic zero signal is provided on hot swap pad 301. In this manner, the output signal of NOR gate 302 is a logic one signal, thereby ensuring that NOR gate 303 outputs a logic zero signal. That signal turns on pull-up transistor 110 which pulls up the voltage on I/O pad 101 to voltage Vcc. Thus, the present invention advantageously provides selective disabling of pull-up transistor 110 via hot swap pad 301 during configuration.

Input buffer disable circuit 300B prevents the inducement of static current when pull-up transistor 110 is disabled and I/O pad 101 has a floating voltage. Input buffer disable circuit 300B includes an input buffer 305 comprising a selectively-disabled inverter 305A and an inverter 305B. During configuration, the logic one signal provided on line 109 is inverted and provided to inverter 304, thereby driving a logic one on the output terminal of that gate. That logic one signal is provided to the gate of a disable transistor 306, thereby turning off that transistor. Note that if disable transistor 306 were not present, transistors 307 and 308 would form a standard inverter.

However, in accordance with the present invention, voltage rail Vcc is accessible to transistor 307 only through disable transistor 306. Thus, if disable transistor 306 is turned off, as indicated for the configuration mode, then transistors 307 and 308 no longer function, thereby disabling inverter 305A. Therefore, during configuration, inverter 305A does not provide an output signal, irrespective of the input signal. In this manner, input buffer disable circuit 300B prevents the inducement of static current when I/O pad 101 has a floating voltage.

To ensure that internal circuits of the PLD are provided a constant, known voltage during configuration, input buffer disable circuit 300B includes a pull-down transistor 309 which turns on when a logic one signal is provided on line 109. Thus, during configuration, inverter 305B drives a logic one signal to the internal circuits of the PLD.

After configuration is complete (the user mode), a logic zero is provided on line 109. In this manner, NOR gate 302 always drives a logic zero on its output terminal (the signal on hot swap terminal 301 is a "don't care"). Thus, the signal on line 112 controls pull-up transistor 110. Specifically, a logic one signal on line 112 turns off pull-up transistor 110, whereas a logic zero signal on line 112 turns on pull-up transistor 110.

Note that in the user mode, output buffer 104 is selectively tristated by the signal provided on line 107. Specifically, a logic one signal allows output buffer 104 to function as a standard output buffer, whereas a logic zero signal tristates output buffer 104. Typically, if output buffer 104 is tristated, then pull-up transistor 110 is turned on.

The logic zero signal provided on line 109 during the user mode, inverted by inverters 108 and 304, turns on transistor 306 and turns off transistor 309. In this manner, inverter 305A functions as a standard inverter, and inverters 305A and 305B function in series as a standard buffer.

Table 1 compares the functioning of various devices in the prior art and in the present invention (UC means user-controlled). These devices include the output buffer, the pull-up transistor, and the input buffer in both the configuration mode and the user mode.

TABLE 1

| Output Buffer | Pull-Up | Input Buffer |
|---|---|---|
| Configuration Mode-Prior Art/Present Invention | | |
| Disabled/Disabled | On/UC | On/Disabled |
| User Mode-Prior Art/Present Invention | | |
| UC/UC | UC/UC | On/On |

As indicated in Table 1, the present invention provides disabling of both the input buffer and the output buffer in the configuration mode to facilitate hot swapping. Moreover, because each of the input buffer, the output buffer, and the pull-up transistor are selectively controlled, the present invention advantageously enables full backward compatibility with previous design solutions involving the PLD.

In accordance with one embodiment of the present invention, the signal on hot swap pad 301 is a global signal provided to all IOBs via one configuration mode pin. Note that the generation of the signal for hot swapping may be combined with other modes. For example, if there were previously two configuration modes (e.g. a master mode and a slave mode), then the introduction of the hot swap mode increases the number of modes to four (both master and slave modes with and without hot swap capability).

Other signals are provided in conventional manners. For example, the signal on line 109 is provided by the internal control logic of the PLD. As previously described, a logic one signal is provided on line 109 during the configuration mode and a logic zero signal is provided on line 109 during the user mode. The signal on line 112 is controlled either by a configuration bit or by the user logic. Assuming control by a configuration bit, the resulting signal remains set until power-down or reconfiguration of the PLD. In contrast, the signal on line 107 is typically controlled by user logic on the PLD. As known by those skilled in the art, having user logic control the functioning of the device(s) provides optimal flexibility in overall IOB operation.

Those skilled in the art will appreciate that the present invention is not limited to FPGAs. For example, the hot swap circuit of the present invention is equally applicable to other PLDs, such as complex programmable logic devices (CPLDs). One type of CPLD, the XC9500™ CPLD sold by Xilinx, Inc., is described in the above-referenced "The Programmable Logic Data Book", pages 3-3 to 3-16. Indeed, the present invention can be used with any integrated circuit including pull-up or pull-down transistors intended to isolate I/O circuitry. Moreover, although the present invention has been shown and described with respect to the embodiment shown in FIG. 3, various modifications would be apparent to those skilled in the art. For example, the logic gates shown might be replaced with other functionally equivalent gates. Additionally, how swap pad 301 could be replaced by a hot swap compatibility indicator switch or similar mechanism, as will be understood by those skilled in the art. Thus, only the attached claims determine the scope of the present invention.

What is claimed is:

1. A hot swap circuit in an integrated circuit having at least one pad for coupling to an active backplane, the hot swap circuit comprising:
   an output buffer disable circuit including an output buffer coupled to the pad; and
   an input buffer disable circuit including an input buffer coupled to the pad, wherein the output buffer disable circuit and the input buffer disable circuit can simultaneously disable the output buffer and the input buffer, respectively.

2. The hot swap circuit of claim 1 wherein the output buffer disable circuit further includes a logic circuit having an output terminal coupled to an enable terminal of the output buffer.

3. The hot swap circuit of claim 1 wherein the output buffer disable circuit further includes:
   a transistor for selectively providing a predetermined voltage to the pad; and
   a logic circuit having an output terminal coupled to a gate of the transistor.

4. The hot swap circuit of claim 1 wherein the output buffer disable circuit further includes means to provide a floating voltage on an output terminal of the output buffer.

5. The hot swap circuit of claim 1 wherein the input buffer disable circuit further includes a logic circuit operatively coupled to the input buffer to selectively disable the input buffer and provide a predetermined voltage on an output terminal of the input buffer.

6. The hot swap circuit of claim 1 wherein the input buffer disable circuit further includes:
   means to selectively disable the input buffer; and
   means to provide a predetermined voltage on an output terminal of the input buffer.

7. A method of hot swapping an integrated circuit coupled to an active backplane via at least one pad, the method comprising:
   providing a floating voltage state on the pad;
   disabling an output buffer coupled to the pad; and
   simultaneously disabling an input buffer coupled to the pad.

8. The method of claim 7 further comprising providing a predetermined voltage on an output terminal of the input buffer.

* * * * *